No. 823,151. PATENTED JUNE 12, 1906.
J. B. AMMONS.
BALING PRESS.
APPLICATION FILED AUG. 23, 1905.
2 SHEETS—SHEET 1.
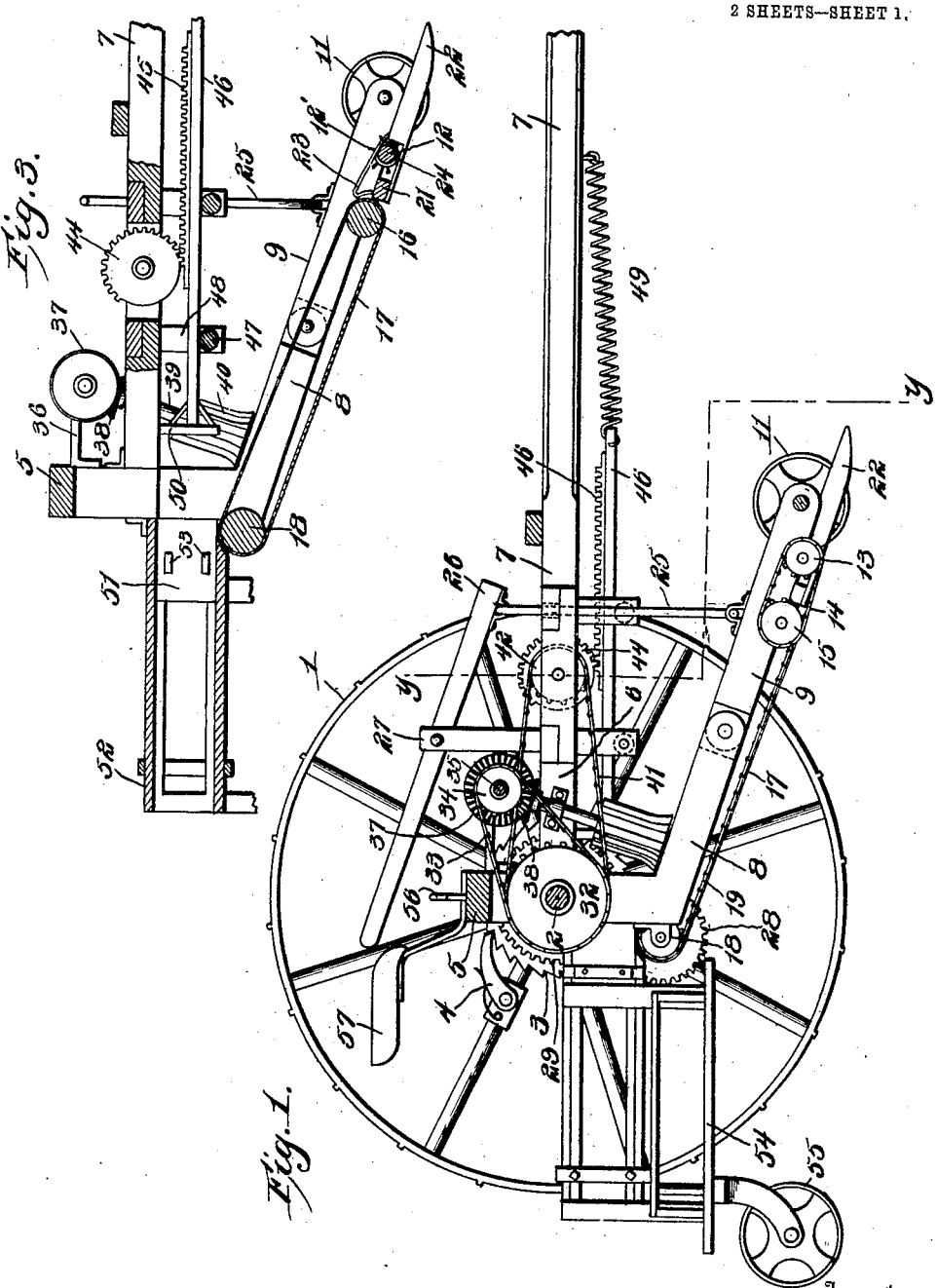
Witnesses
Louis R. Heinrichs
Herbert D. Lawson
Inventor
J. B. Ammons
By W. T. FitzGerald
Attorneys

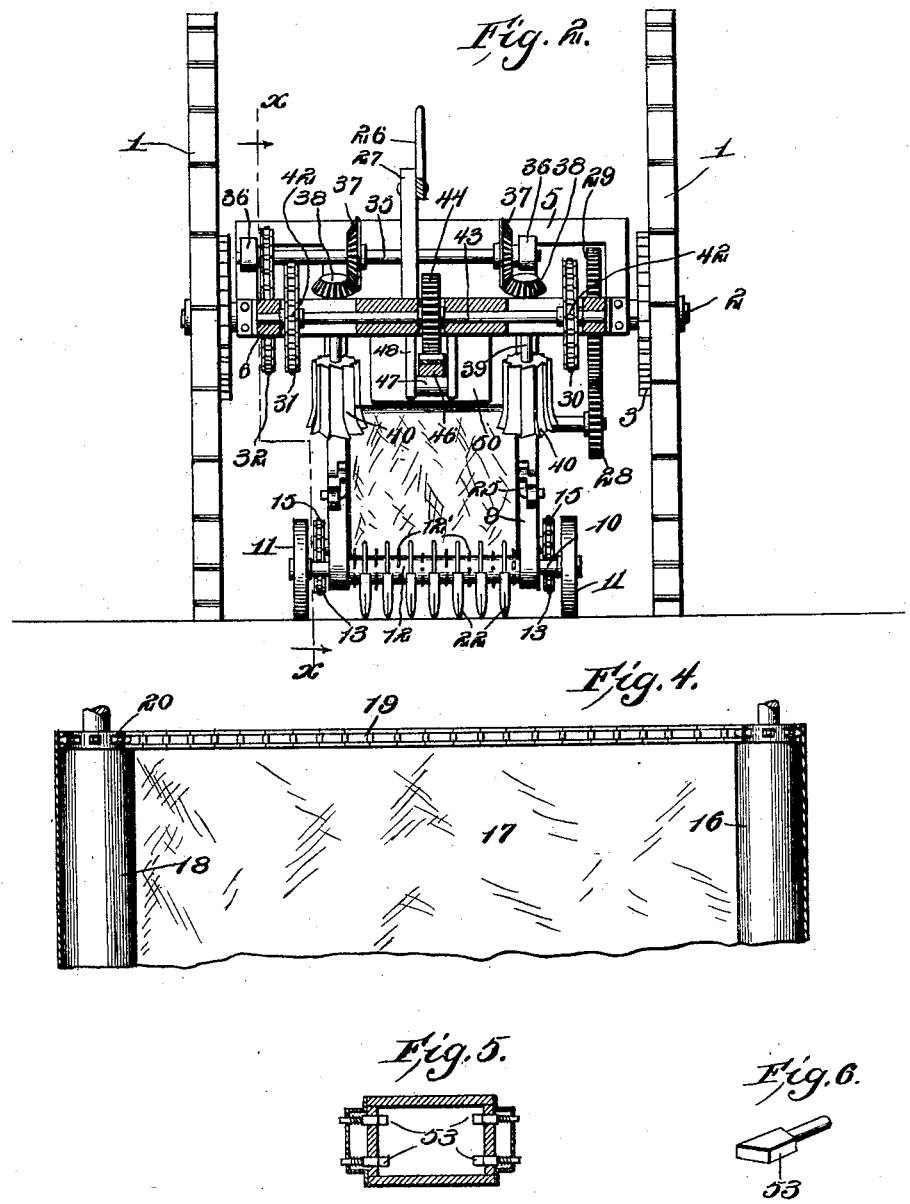

UNITED STATES PATENT OFFICE.

JOHN B. AMMONS, OF HAZEN, ARKANSAS.

BALING-PRESS.

No. 823,151.  Specification of Letters Patent.  Patented June 12, 1906.

Application filed August 23, 1905. Serial No. 275,417.

*To all whom it may concern:*

Be it known that I, JOHN B. AMMONS, a citizen of the United States, residing at Hazen, in the county of Prairie and State of Arkansas, have invented certain new and useful Improvements in Baling-Presses; and I do hereby declare the following to be a full, clear, and exact description of the invention, such as will enable others skilled in the art to which it appertains to make and use the same.

My invention relates to baling-presses, and it is more particularly a machine for collecting material to be baled and for conveying it to a press which is operated by mechanism set in motion by the traction-wheels of the machine.

Another object is to provide means whereby the material to be baled will be automatically conveyed upward to the compressing mechanism, said collecting and conveying means being also actuated by the traction-wheels.

With the above and other objects in view the invention consists of a frame mounted upon traction-wheels from which the power for operating the parts of the mechanism is derived. These wheels transmit rotary motion through pawls and ratchets to the driving shaft or axle, and by means of a series of gears, &c., this rotary motion is transmitted to an endless carrier, which receives the material from fingers adapted to pass over the ground. A baling-compartment is disposed upon the frame and has a plunger therein, the stem of which receives intermittent reciprocating movement from gears provided for that purpose, and is adapted to automatically compress within the baling-compartment all of the material fed thereto by the conveyer.

The invention also consists of means for holding the material at a proper point upon the conveyer, so that the same will be fed into the path of the plunger.

The invention also consists of further novel constructions and combination of parts, which will be hereinafter more fully described, and pointed out in the claims.

In the accompanying drawings I have shown the preferred form of my invention.

In said drawings, Figure 1 is a section taken on line X X, Fig. 2, showing the mechanism of the machine in side elevation. Fig. 2 is a section on line y y, Fig. 1, showing all of the mechanism excepting the plunger and the adjusting-lever in end elevation. Fig. 3 is a central longitudinal section through the baling-compartment, the conveyer, and the parts cooperating therewith. Fig. 4 is a bottom plan view of a portion of the conveyer. Fig. 5 is a section through the receiving end of the baling-compartment, and Fig. 6 is a detail view of one of the retaining-dogs.

Referring to the figures by numerals of reference, 1 1 are traction-wheels rotatably mounted on a power-shaft or axle 2, and this axle has ratchet-wheels 3 secured to it, which are normally engaged by spring-pressed pawls 4, secured to the wheels 1. It is therefore evident that whenever the machine is drawn forward rotary motion will be transmitted therefrom to the driving-shaft 2 through the pawls 4 and ratchet-wheels 3. An arch 5 is mounted on the driving-shaft 2 and has a frame 6 secured to it and extending therefrom, said frame being provided with a tongue 7. Angular arms 8 extend downward from the arch 5, and to the lower ends thereof are pivoted side strips 9, having stud-shafts 10, projecting laterally from their free ends and on which are mounted small wheels 11. Disposed within the side strips 9 and in rear of wheels 11 is a roller 12, having a series of prongs 12' extending therearound, and this roller has a sprocket 13 secured to it, on which is mounted a chain 14. This chain receives motion from a sprocket 15, secured to a roller 16, which is journaled within the side strips 9 and constitutes the lower support for an endless apron or conveyer 17. The other support for this conveyer consists of a roller 18, mounted upon the angular arms 8 at a point beneath the power-shaft 2, and the two rollers 16 and 18 are caused to move in unison by chain 19, which is mounted on them and engages teeth 20, extending from the rollers, as shown in Fig. 4. A cross-bar 21 is disposed between rollers 12 and 16, and extending forward from this cross-bar are fingers 22. Each finger 22 has a guiding extension 23 in the form of a wire, which extends upward from the finger and over the roller 12 to a point in close proximity to roller 16, and the upper end of its guiding extension is secured within the cross-bar 21. The extensions 23 are located within grooves 24, formed in roller 12, between the series of prongs 12'. A yoke 25 is pivotally connected to the side strips 9 and is slidably mounted in the frame 6. This yoke is secured to one end of an operating-lever 26, which is fulcrumed upon a standard 27 on the frame, and by pressing down upon the free end of the lever it is obvious that the side strips 9 will be swung upward on their pivots, so as to raise fingers 22 and the wheels 11 out of contact with the ground.

The roller 18, heretofore referred to, has a gear 28 secured to one end, and this gear meshes at all times with a driving-gear 29, secured to the shaft or axle 2. A series of sprockets 30, 31, and 32 are also secured to the power-shaft 2, and sprocket 32 drives a chain 33, which transmits motion to a sprocket 34, secured to a shaft 35. This shaft is mounted in bearings 36, extending from the arch 5, and has oppositely-disposed beveled gears 37 secured to it, which mesh with beveled gears 38, secured to the upper ends of shafts 39. These shafts are journaled at their lower ends in the arms 8 and have guide-rollers 40 secured to them and overlapping the sides of the conveyer 17. Each roller has a series of blades extending from it and disposed longitudinally thereon, said blades serving to throw the material which is upon the conveyer 17 toward the center thereof. The two sprockets 30 and 31 transmit motion through chains 41 to sprockets 42, located on a shaft 43, journaled within the frame 6. This shaft has a segmental gear 44 secured to it, which is adapted to mesh with a rack 45, secured upon the stem 46, which is mounted on rollers 47, supported by hangers 48 from frame 6. The front end of the stem 46 is connected, by means of a coiled spring 49, with the tongue 7, while the other end of the stem has a plunger 50, which is adapted to reciprocate within the compressing-chamber 51 of a baling-press 52. This baling-press extends rearwardly from and is secured to the arch 5 and its arms 8, as shown in Fig. 3, and has spring-pressed plungers 53 on the sides thereof for engaging the material forced thereinto, so as to prevent it from expanding subsequent to the compressing operation. A platform 54 is located at each side of the press 52, so that the person employed for tying the bales can have convenient access thereto. A caster 55 supports the rear end of the baling-compartment. A hook 56 is disposed upon the arch 5 close to the driver's seat 57 and is adapted to be engaged by the lever 26, so as to hold the fingers 22 and wheels 11 out of contact with the ground.

When the machine is drawn forward, the pawls 4 will engage ratchet-wheels 3 and cause the rotation of the power-shaft or axle 2. Motion will therefore be transmitted from said axle to the shafts 35 and 43 through the sprockets and chains and to the roller 18 through the gears 28 and 29. Motion will be transmitted from roller 18 to roller 16 through chain 19, and the apron 17 will be caused, therefore, to travel upward, so as to convey material thereon toward the upper portion of the apron. At the same time the roller 12 will be revolved by the chains 14 and sprockets 13 and 15, so that the prongs 12' will engage material collected by the fingers 22 and pull it along the extensions 23 and finally deposit it on the carrier 17. When shaft 35 rotates, it transmits motion through gears 37 and 38 to the rollers 40, and the blades on these rollers serve to throw the material toward the center of the carrier 17, so that it will be brought into the path of the plunger 50. As shaft 43 is also rotated during the forward movement of the machine, the segmental gear 44 carried thereby will force the rack 45 and stem 46 longitudinally, so as to cause the plunger 50 to press the material, which is on the upper end of the conveyer 17, into the compartment 51 and to tension the spring 49. After the gear 44 has completed a partial revolution that portion thereof containing no teeth will arrive above the rack, so as to release it and stem 46, so that the tensioned spring 49 will return said parts to their initial position ready to be again actuated at the proper time by the rotating gear 44. It will be noticed that the baling operation continues uninterruptedly during the forward movement of the machine and that the lower portion of the conveyer can be readily raised by means of lever 26, so as to pass over uneven surfaces. If it is desired to throw the machine out of operation, it is merely necessary to disengage the pawls 4 from the ratchet-wheels 3. It will be seen that the machine is very compact in construction and constitutes a great saving, in that hay, &c., may be collected and baled at one operation.

Having thus fully described my invention, what I claim as new, and desire to secure by Letters Patent, is—

1. In a machine of the character described, the combination with a frame and traction-wheels supporting the same; of a longitudinally-extending compressing-compartment secured to the frame, a plunger adapted to reciprocate therein, means operated by the traction-wheels for actuating the plunger in one direction, means for automatically returning the plunger to its initial position at predetermined periods, an endless conveyer supported by the frame, means for gathering material and for directing it upon the conveyer, and rotary means upon opposite sides of the conveyer for centering material thereon and directing it into the compressing-compartment.

2. In a machine of the character described, the combination with a frame and traction-wheels supporting the same; of a compressing-compartment arranged longitudinally upon the frame, an endless conveyer adjustably mounted upon the frame, means for gathering material and for directing it upon the conveyer, and rotary means at the sides of the conveyer for centering the material upon the conveyer and for directing it into the compressing-compartment.

3. In a machine of the character described, the combination with a frame and traction-wheels for supporting the same; of a conveyer, rotatable devices adjacent the receiving portion of the conveyer for engaging material and directing it upon the conveyer, and rotatable blades adjacent the sides of said conveyer for centering the material thereon.

4. In a machine of the character described the combination with a frame and traction-wheels for supporting the same; of a conveyer supported by the frame, a roller adjacent the receiving portion of the conveyer for engaging material and directing it upon said conveyer, fingers extending beyond the roller, and extensions thereon partly surrounding the roller.

5. In a machine of the character described the combination with a frame and traction-wheels for supporting the same; of a conveyer supported by the frame, a roller adjacent the receiving portion of the conveyer for engaging material and directing it upon said conveyer, fingers extending beyond the roller, extensions thereon partly surrounding the roller, and means for adjusting the front portion of the conveyer and the parts adjacent thereto from or toward the ground.

6. In a machine of the character described the combination with a frame and traction-wheels for supporting the same; of an endless conveyer supported by the frame, means for transmitting motion thereto from the traction-wheels, rotary series of prongs for directing the material upon the conveyer, gathering-fingers extending forward beyond the prongs, extensions thereon disposed between the series of prongs and adjacent the conveyer, and mechanism for transmitting motion from the conveyer to the series of prongs.

7. In a machine of the character described the combination with a frame and traction-wheels for supporting the same; of an endless conveyer supported by the frame, means for transmitting motion thereto from the traction-wheels, rotary series of prongs for directing the material upon the conveyer, gathering-fingers extending forward beyond the prongs, extensions thereon disposed between the series of prongs adjacent the conveyer, mechanism for transmitting motion from the conveyer to the series of prongs, and means for vertically adjusting the front portion of the conveyer and the prongs and fingers.

8. In a machine of the character described the combination with a frame and traction-wheels supporting the same; of an endless conveyer carried by the frame, means for transmitting motion thereto from one of the wheels, means at opposite sides of the conveyer for centering the material thereon, and mechanism for transmitting motion to said means from one of the wheels.

9. In a machine of the character described the combination with a frame and traction-wheels supporting the same; of an endless conveyer carried by the frame, means operated by one of the wheels for actuating the conveyer, means for gathering material and directing it upon the conveyer, means at opposite sides of the conveyer for centering material thereon, and mechanism operated by one of the wheels for actuating the directing and centering means simultaneously with the conveyer.

In testimony whereof I have signed my name to this specification in the presence of two subscribing witnesses.

JOHN B. AMMONS.

Witnesses:
Jno. W. Calley,
A. J. Barrett.